United States Patent
Baumgartner

(10) Patent No.: US 9,382,955 B2
(45) Date of Patent: Jul. 5, 2016

(54) DISC BRAKE HAVING A RELEASE SPINDLE FOR THE ADJUSTMENT DEVICE

(75) Inventor: Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1283 days.

(21) Appl. No.: 12/604,219

(22) Filed: Oct. 22, 2009

(65) Prior Publication Data
US 2010/0133053 A1    Jun. 3, 2010

Related U.S. Application Data

(63) Continuation of application No. PCT/EP2008/003068, filed on Apr. 17, 2008.

(30) Foreign Application Priority Data

Apr. 25, 2007   (DE) .......................... 10 2007 019 440

(51) Int. Cl.
   *F16D 65/56*   (2006.01)
   *F16D 65/00*   (2006.01)

(52) U.S. Cl.
   CPC .......... *F16D 65/0043* (2013.01); *F16D 65/567* (2013.01)

(58) Field of Classification Search
   CPC ........................... F16D 65/567; F16D 65/0043
   USPC ........ 188/79.57, 196 M, 196 R, 196 V, 196 P, 188/79.56, 79.58, 79.59, 79.63, 71.7, 71.8, 188/71.9
   See application file for complete search history.

(56) References Cited

U.S. PATENT DOCUMENTS

| | | | |
|---|---|---|---|
| 3,113,646 A * | 12/1963 | Airheart et al. ............ | 188/196 P |
| 4,527,683 A * | 7/1985 | Mathews .................. | 192/111.12 |
| 6,820,727 B1 | 11/2004 | Theiss et al. | |
| 2005/0252727 A1 * | 11/2005 | England et al. .......... | 188/1.11 L |

FOREIGN PATENT DOCUMENTS

| | | | | |
|---|---|---|---|---|
| DE | 3130583 A1 * | 2/1983 | .............. | F16D 65/52 |
| DE | 198 17 892 A1 | 10/1999 | | |
| DE | 199 23 457 C1 | 11/2000 | | |
| DE | 196 32 917 84 | 11/2004 | | |
| EP | 0 566 008 A1 | 10/1993 | | |

(Continued)

OTHER PUBLICATIONS

Niemann, G.: Machine Elements—vol. 1, Springer Verlag, Berlin, Heidelberg, New York, $2^{nd}$ edition, pp. 359 to 368.

(Continued)

*Primary Examiner* — Xuan Lan Nguyen
(74) *Attorney, Agent, or Firm* — Crowell & Moring LLP

(57) ABSTRACT

A disc brake for a commercial vehicle is equipped with a wear adjustment device having two adjustment spindles and a slip clutch actuated when a certain torque is exceeded. The slip clutch is designed such that it can be installed in existing installation spaces. The slip clutch is a safety adapter that is pressed onto the end region of each adjustment spindle via a press fit. In order to achieve the press fit, an inner contour of the safety adapter deviates from a circular shape and that an oversize is selected such that sufficient press forces are generated. The disc brake is particularly suited for heavy trucks and cantilevers.

17 Claims, 2 Drawing Sheets

(56) References Cited

FOREIGN PATENT DOCUMENTS

| EP | 0 566 008 B1 | 10/1993 |
| EP | 1 596 092 A1 | 11/2005 |
| GB | 2 304 387 A | 3/1997 |
| WO | WO 99/54637 A1 | 10/1999 |

OTHER PUBLICATIONS

German Office Action dated Aug. 13, 2008 including English translation (Seven (7) pages).

German Office Action dated Mar. 4, 2008 including English translation (Six (6) pages).

International Search Report dated Oct. 17, 2008 including English translation (Four (4) pages).

* cited by examiner

DISC BRAKE HAVING A RELEASE SPINDLE FOR THE ADJUSTMENT DEVICE

CROSS-REFERENCE TO RELATED APPLICATIONS

This application is a continuation of PCT International Application No. PCT/EP2008/003068, filed Apr. 17, 2008, which claims priority under 35 U.S.C. §119 to German Patent Application No. DE 10 2007 019 440.6, filed Apr. 25, 2007, the entire disclosures of which are herein expressly incorporated by reference.

BACKGROUND AND SUMMARY OF THE INVENTION

The invention relates to a disc brake for a commercial vehicle. The disc brake includes a caliper that straddles a brake disc and has two brake linings (pads) arranged one on each side of the brake disc. The disc brake is equipped with an adjustment device for compensating wear of the brake linings. The adjustment device has at least one adjustment spindle or piston associated with a slip clutch, which is actuated when a given torque is exceeded.

A brake of this type is known from EP 05 66 008 A1.

The vehicle brake in question is designed, in particular, for commercial vehicles. Especially in these vehicles, the brake linings are highly stressed because of the large masses to be braked. The wear of the brake linings is therefore correspondingly high. The adjustment device is so designed that adjustment takes place according to the degree of wear of the brake linings.

When brake linings are exchanged, it can occur, because of the design of the adjustment device, that a permissible torque of the internal adjustment mechanism is exceeded. This torque is applied via a manual readjustment device, or the adjustment spindle. If a given torque is exceeded in this way, the slip clutch is actuated. This clutch might also be referred to as a safety or overload clutch. In the case of the disc brake in question here, the slip clutch has the function of preventing damage or destruction caused by the shortcomings of the adjustment device.

Slip clutches are generally known. Friction clutches with a constant application force, which force may, however, also be adjustable, are distinguished in terms of function. So-called multi-disc clutches having a different construction are also used. The discs are made either of steel, although they may also be provided with friction linings. The application force is generated by suitable springs.

It is the object of the present invention to configure a disc brake of the type described in detail above in such a manner that the slip clutch can be manufactured at low cost and can be designed in accordance with the installation possibilities existing in disc brakes.

This object is achieved by configuring the slip clutch in the manner of a safety adapter, which is mounted on an end region of each adjustment spindle by a non-positive connection such that the safety adapter can be rotated with respect to the adjustment spindle when a given torque is exceeded.

In the normal embodiment of the disc brake, the adjustment device is designed such that it is equipped with two adjustment spindles running parallel to and at a distance from one another. The adjustment spindles are connected drivingly to one another via a synchronization device. Consequently, the safety adapter is mounted on the end region of each adjustment spindle oriented away from the synchronization device.

The safety adapter is an extremely simple component, which is configured in the manner of a sleeve and can be produced with the necessary precision by means of a suitable manufacturing process. The magnitude of the forces forming the non-positive connection is governed by the torque which must be transmitted in the normal operating state of the brake.

According to a preferred embodiment, it is provided that the non-positive connection between the adjustment spindle and the safety adapter is formed by a press fit. This press fit may be effected in various ways.

For example, it is provided that the external diameter of the adjustment spindle has, at least in the region of the safety adapter, an oversize with respect to the internal diameter of the safety adapter, and/or that the internal diameter of the safety adapter has an oversize with respect to the external diameter of the adjustment spindle. Independently of the oversize, however, the safety adapter is expanded when it is pressed onto the end region of the adjustment spindle, since the safety adapter is in the form of a sleeve at least in the region over which the end region of the adjustment spindle extends, while the end region of the adjustment spindle is solid. In the possibilities described previously, however, the external diameter of the adjustment spindle and the internal diameter of the safety adapter have a circular configuration.

According to a further embodiment, it is provided that the press fit between the end region of the adjustment spindle and the safety adapter is formed by an external contour of the adjustment spindle and/or an internal contour of the safety adapter, which contour deviates from a circular one.

This embodiment has the advantage that an elastic deformation of the safety adapter and/or of the end region of the adjustment spindle takes place as the safety adapter is pressed onto the end region of the adjustment spindle, so that the non-positive connection is especially intimate. If the end region of the adjustment spindle is circular, the safety adapter is deformed to a circular contour as it is pressed on. Because, with this method, the compressive forces are not produced solely by expansion of the safety adapter, but rather bending stresses also occur as a result of the deformation of the contour of the safety adapter, the end region of the adjustment spindle can have a relatively large oversize, yielding the advantage that the tolerances can be larger.

In another preferred embodiment, the safety adapter is made from an especially ductile and tough material. If the end region of the adjustment spindle is oversized with respect to the bore of the safety adapter, a plastic deformation of the safety adapter takes place; that is, during the pressing-on process, the bore diameter is permanently enlarged through adaptation to the actual diameter of the end region of the adjustment spindle, determining a residual tension force in the press-fit connection. This residual tension force is determined by the yielding point of the material selected for the safety adapter.

In a further development, it is provided that, in relation to the separated state of the adapter from the end region of the adjustment spindle, the external contour of the end region of the adjustment spindle, and/or the internal contour of the safety adapter, is/are configured in the manner of a polygon. In a preferred embodiment, this polygon is an oval, an ellipse or a triangular or quadrangular polygon, the deviations from the circular shape being relatively small.

Because, in a preferred embodiment, the safety adapter is deformed as it is pressed onto the end region of the adjustment spindle, it is provided that the safety adapter is in the form of a sheet-metal press part produced by a deep-drawing process. However, in another embodiment, it is also possible for the safety adapter to be configured as a press part produced by cold forming. This press part might be produced, for example, by means of a suitable tool. Furthermore, the safety adapter might be a molded part produced by a sintering process.

In order that the adjustment device can still be readjusted in the event of damage to or loss of the adapter, it is provided that the end region of the adjustment spindle associated with the safety adapter is provided with a polygonal recess, preferably a hexagon socket.

The safety adapter is configured in such a manner that it projects with respect to the end face of the adjustment spindle and that the projecting portion has, at least over a certain length, a polygonal configuration, preferably in the form of a hexagon key.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
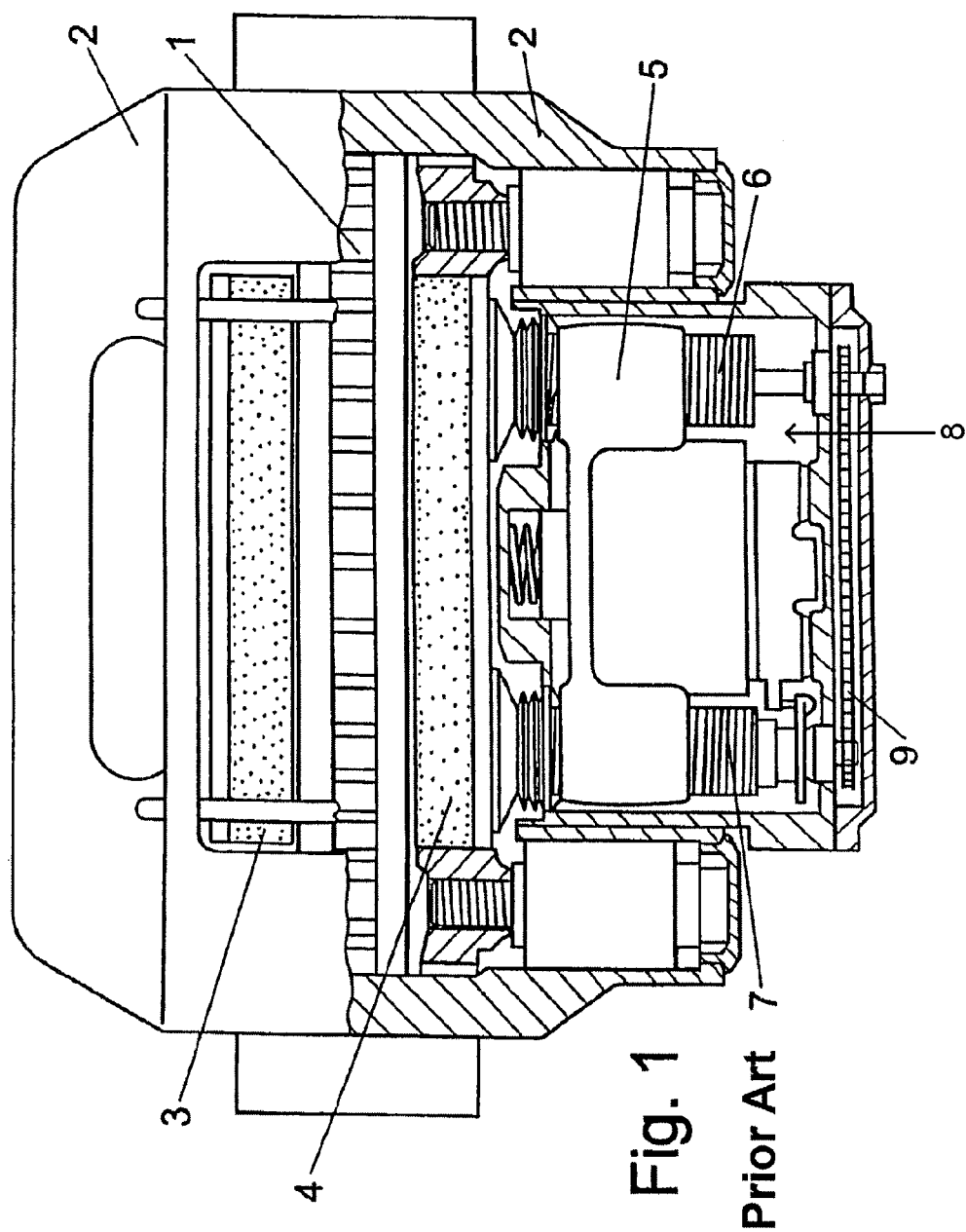
FIG. 1 shows in longitudinal section the brake application device with the brake disc arranged in the caliper, along with the brake linings.

FIG. 1 shows that a brake disc 1 fitted to an axle (not shown) of a commercial vehicle is arranged so as to be straddled by a brake caliper 2. The brake linings (pads) 3, 4 are arranged on each side of the brake disc 1. The disc brake is preferably further equipped with a cross-member (bridge) 5, in which are mounted two adjustment spindles (pistons) 6, 7 arranged parallel to and at a distance from one another. The entire brake application device is designated by reference numeral 8. The two adjustment spindles 6, 7 are coupled synchronously to one another by way of a synchronization device, in the exemplary embodiment illustrated by a chain drive 9. A complete disc brake is described, for example, in EP 0 566 008 A1.

Figure 2:
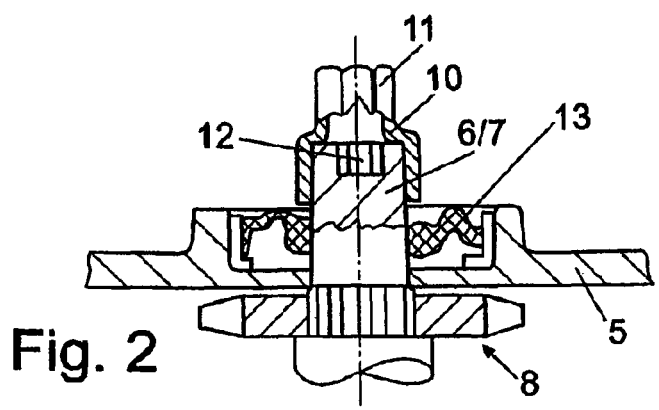
FIG. 2 shows a detail of an adjustment spindle, including the press-fit connection of the end region of the adjustment spindle to a safety adapter in a sectional representation.

FIG. 2 shows an adjustment spindle 6 or 7 mounted rotatably or screwed into the cross-member 5 and provided with the safety adapter 10, which fits over a free end region of the spindle 6, 7. The connection is effected in a non-positive manner by a press fit, so that the adjustment spindle 6, 7 can transmit a given torque to the safety adapter 10. When this torque is exceeded—thus releasing the adjustment spindle 6 or 7—the safety adapter 10 rotates with respect to the respective adjustment spindle 6 or 7, so that the internal components of the brake application device 8 are protected from destruction or fracture. The safety adapter 10 projects or extends along the axis of the adjustment spindle 6,7 with respect to its free end face. In the exemplary embodiment illustrated, this projecting portion is configured as a hexagon key 11. Each adjustment spindle 6, 7 is provided, in the region encompassed by the safety adapter 10, with a recess which, in the exemplary embodiment illustrated, is configured as a hexagon socket 12. This allows for the possibility of rotating back (reversing) the entire adjustment device in the event of breakage of the safety adapter 10. In addition, a shaft sealing ring 13 is inserted in the cross-member 5.

Figure 3:
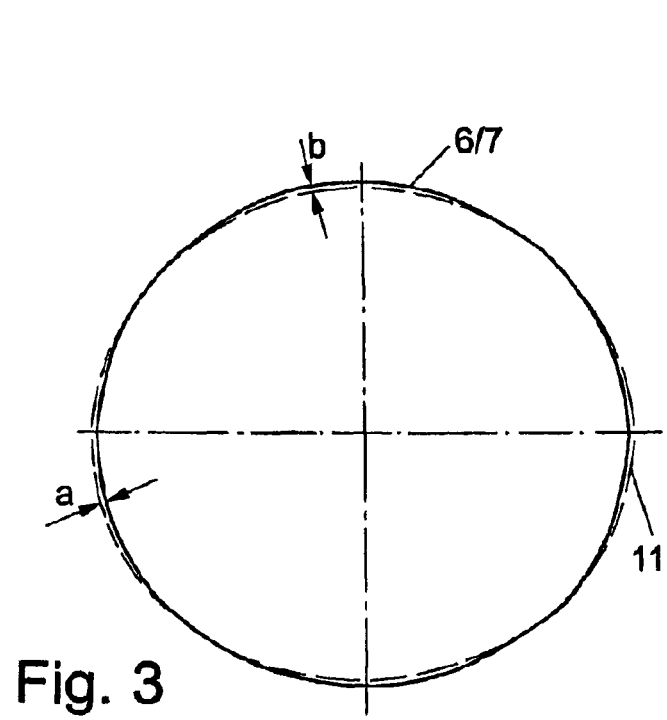
FIG. 3 is a schematic diagram showing the oversize between the end region of the adjustment spindle and the safety adapter.

FIG. 3 clarifies the oversize formed by the internal face of the safety adapter 10. According to this schematic diagram, at least the end region of the external face of each adjustment spindle 6, 7 is circular, while the internal face of the safety adapter 10 is shaped as a polygon. As the safety adapter 10 is pressed onto the respective adjustment spindle 6, 7, this internal contour adapts to the external face of the adjustment spindle 6, 7. The oversize of the safety adapter 10 is designated by "a" and the oversize of the end region of the adjustment spindle 6, 7 by "b". In order to produce a press-fit connection, it is necessary for the oversize "b" of the adjustment spindle 6, 7 to be larger than the oversize "a" of the safety adapter 10.

The invention is not restricted to the exemplary embodiment illustrated. Only the safety element for protecting the internal components of the brake application device 8 need be implemented by a safety adapter 10, which is pressed onto the end region of each adjustment spindle 6, 7 and which rotates with respect to the adjustment spindle 6, 7 when a given torque is exceeded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, the disc brake comprising:
   a caliper which, in use, straddles the brake disc;
   a brake application device including a wear adjustment device for compensating wear of brake pads, said wear adjustment device including at least one adjusting spindle and an associated slip clutch, the slip clutch being actuated when a given torque is exceeded; and
   wherein the slip clutch comprises a safety adapter operatively configured to fit onto an end region of the adjustment spindle via a non-positive connection such that the safety adapter is rotatable with respect to the adjustment spindle when the given torque is exceeded, the non-positive connection between the adjustment spindle and the safety adapter being a press fit connection.

2. The disc brake according to claim 1, wherein the adjustment spindle has an external diameter that is oversized with respect to an internal diameter of the safety adapter.

3. The disc brake according to claim 1, wherein an internal diameter of the safety adapter is oversized with respect to an external diameter of the adjustment spindle.

4. The disc brake according to claim 2, wherein an internal diameter of the safety adapter is oversized with respect to an external diameter of the adjustment spindle.

5. The disc brake according to claim 4, wherein the press fit between the safety adapter and the adjustment spindle is formed by at least one of the external contour of the adjustment spindle deviating from a circular contour and the internal contour of the safety adapter deviating from a circular contour.

6. The disc brake according to claim 5, wherein at least one of the external contour of the adjustment spindle and the internal contour of the safety adapter is configured as a polygon contour.

7. The disc brake according to claim 6, wherein the polygon contour is one of an oval, a triangular, and a quadrangular polygon.

8. The disc brake according to claim 1, wherein the safety adapter is a sheet-metal deep-drawn press part.

9. The disc brake according to claim 1, wherein the safety adapter is a cold formed part.

10. The disc brake according to claim 1, wherein the safety adapter is a sintered part.

11. A disc brake having a brake disc, the disc brake comprising:
- a caliper which, in use, straddles the brake disc;
- a brake application device including a wear adjustment device for compensating wear of brake pads, said wear adjustment device including at least one adjusting spindle and an associated slip clutch, the slip clutch being actuated when a given torque is exceeded;
- wherein the slip clutch comprises a safety adapter operatively configured to fit onto an end region of the adjustment spindle via a non-positive connection such that the safety adapter is rotatable with respect to the adjustment spindle when the given torque is exceeded; and
- wherein an end region of the adjustment spindle associated with the safety adapter includes a polygonal recess.

12. The disc brake according to claim 11, wherein the polygonal recess is a hexagon socket.

13. The disc brake according to claim 1, wherein the safety adapter is operatively configured to project outward along a longitudinal axis of the adjustment spindle from an end face of the adjustment spindle, a projecting portion of the safety adapter having a polygonal shape.

14. The disc brake according to claim 13, wherein the polygonal shape is a hexagon shape.

15. A slip clutch for a wear adjustment device of a disc brake for a commercial vehicle, the wear adjustment device including at least one adjustment spindle having a longitudinal axis, the slip clutch comprising:
- a safety adapter operatively configured to fit over an end region of the adjustment spindle with a non-positive connection, a portion of the safety adapter extending from an end face of the adjustment spindle along the longitudinal axis; and
- wherein the non-positive connection is a press-fit connection operatively configured such that the safety adapter is rotatable with respect to the adjustment spindle when a defined torque is exceeded.

16. The slip clutch according to claim 15, wherein at least one of an external diameter of the adjustment spindle is oversized with respect to an internal diameter of the safety adapter and an internal diameter of the safety adapter is oversized with respect to an external diameter of the adjustment spindle.

17. The slip clutch according to claim 16, wherein the extending portion of the safety adapter has a polygonal-shaped cross section.

\* \* \* \* \*